United States Patent
Suzuki

(10) Patent No.: US 7,418,564 B2
(45) Date of Patent: Aug. 26, 2008

(54) STORAGE CONTROLLER, STORAGE CONTROL SYSTEM AND STORAGE CONTROL METHOD FOR MIRRORING VOLUMES

(75) Inventor: Katsuyoshi Suzuki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 242 days.

(21) Appl. No.: 11/257,014

(22) Filed: Oct. 25, 2005

(65) Prior Publication Data

US 2007/0050576 A1   Mar. 1, 2007

(30) Foreign Application Priority Data

Aug. 30, 2005   (JP) .............................. 2005-249583

(51) Int. Cl.
*G06F 12/00*   (2006.01)
*G06F 13/00*   (2006.01)
*G06F 13/28*   (2006.01)
*G06F 11/00*   (2006.01)

(52) U.S. Cl. ........................ 711/162; 711/161; 711/165; 714/5; 714/6

(58) Field of Classification Search ................... 711/162
See application file for complete search history.

(56) References Cited

U.S. PATENT DOCUMENTS

2003/0093638 A1*   5/2003   Margerie et al. ............ 711/162
2004/0260901 A1*   12/2004   Yamagami et al. .......... 711/162
2006/0047930 A1*   3/2006   Takahashi et al. ........... 711/162

FOREIGN PATENT DOCUMENTS

JP   2000-330730 A   11/2000
JP   2004-019213 A   1/2004

\* cited by examiner

*Primary Examiner*—Kevin Ellis
*Assistant Examiner*—Ryan Bertram
(74) *Attorney, Agent, or Firm*—Mattingly, Stanger, Malur & Brundidge, P.C.

(57) ABSTRACT

The present invention provides a storage control technique that leaves no failure in a file system of a secondary volume even if the secondary volume is split from a primary volume with no restriction on server access to volumes in a storage controller. This invention provides a system including: a host system 100; a storage controller 101 for performing data processing between a storage device and the host system in response to requests from the host system; and a management server 130. The storage controller has a controller 104 that performs release processing to release mirroring between a primary volume 102 and a secondary volume 103 with access from the host system to the primary volume being permitted. The management server 130 executes a management program for examining volume management information about the secondary volume after the release processing.

2 Claims, 5 Drawing Sheets

STORAGE CONTROLLER, STORAGE CONTROL SYSTEM AND STORAGE CONTROL METHOD FOR MIRRORING VOLUMES

CROSS-REFERENCES TO RELATED APPLICATIONS

This application relates to and claims priority from Japanese Patent Application No. 2005-249583, filed on Aug. 30, 2005, the entire disclosure of which is incorporated herein by reference.

BACKGROUND OF THE INVENTION

The present invention relates to a storage controller such as a disk array apparatus, and more particularly, to a storage controller that is configured to: examine whether a file system copied from a primary volume to a secondary volume has any errors or not; enable input to and output from (I/O access to) the secondary volume if it is determined that the file system has no errors; and ensure that the file system of the secondary volume is kept as backup data.

When date from a host system such as a server or a host computer is stored in a disk array apparatus, the following operation is generally conducted for data backup: establishing a primary volume and a secondary volume in the disk array apparatus and using the secondary volume to mirror the primary volume. To "mirror" means that the secondary volume mirrors the primary volume and the content of the primary volume is reproduced in the secondary volume.

When performing data backup, a disk array apparatus controller splits the secondary volume from the primary volume (SPLIT processing) and transfers backup data from the secondary volume, that has been made static by the SPLIT processing, to a different storage resource such as a tape device or another disk array apparatus. After data backup has been completed, the disk array apparatus makes the secondary volume mirror the primary volume.

Data backup is performed in a state where the secondary volume is split from the primary volume and receives no I/O access from the host computer or the like in order to prevent data being updated during backup. Accordingly, the backup is performed at the point in time the secondary volume is split from the primary volume.

The above operation is disclosed in JP-A-2000-330730 as a difference copying system. Furthermore, as a technique to instantly make a copy of a primary volume, JP-A-2004-19213 discloses a copy volume generating method and disk device.

SUMMARY OF THE INVENTION

In the above-described conventional examples, volumes are split immediately after a command is sent from the host computer to the disk array apparatus. However, if data write processing is being performed at the same time as the SPLIT processing, there is a possibility that the data may be corrupt.

So, some database applications are designed to stop the database server accessing the relevant volume for a moment and to execute SPLIT processing at that point in time. However, although that kind of control is required to be done on the application side, it is not a feature of, for example, inexpensive applications.

In conventional storage control systems, the state of a server's access to a disk array apparatus being blocked, i.e., the state of an application being stopped is created by executing a command to stop the application and perform unmount processing for the disk array apparatus. When SPLIT processing finishes, the disk array apparatus is again mounted on the server. It is necessary to suspend the system during that time. Consequently, a client's demand for continuous system operation cannot be satisfied. Nevertheless, as already stated above, if the disk array apparatus is subjected to SPLIT processing while being accessed by the server, the file system may, in the worst case, be corrupt.

An object of the present invention is to provide a storage control technique that leaves no failure in the file system of a secondary volume even if the secondary volume is split from the primary volume without restricting server access to volumes in a storage controller. Another object of the present invention is to provide a storage control technique that can provide a backup device such as a tape device or other storage controllers with the assurance that the backup data has no errors.

In order to achieve the above-described objects, this invention is characterized in that: a file system of a secondary volume that is split from a primary volume without stopping server access to the primary volume is verified; and after confirming that the file system of the secondary volume has no errors, a backup copy of the secondary volume is made in a different storage resource.

According to one aspect of the present invention, provided is a storage controller having a storage device and performing data processing between the storage device and a host system in response to a request from the host system, the storage controller including: a primary volume accessible from the host system; a secondary volume mirroring the primary volume; a controller for performing release processing to release mirroring between the primary volume and the secondary volume with access from the host system to the primary volume being permitted; and a utility for examining volume management information about the secondary volume after the release processing. The "utility" means, for example, a volume management program, a management server that executes a management program, or a program for enabling the management program in the storage controller. Accordingly, the volume examination is performed by the management server, the host system, or the storage controller itself.

According to another aspect of the present invention, provided is a storage control system including: a host system; a storage controller having a storage device and performing data processing between the storage device and the host system in response to a request from the host system; and a management server, wherein the storage controller includes: a primary volume having a file system accessible from the host system; a secondary volume mirroring the primary volume; and a controller for performing release processing to release mirroring between the primary volume and the secondary volume with access from the host system to the primary volume being permitted, and wherein the management server executes a management program for examining volume management information about the secondary volume after the release processing.

According to a further aspect of the present invention, provided is a storage control method for performing data processing between a storage controller and a host system in response to a request from the host system. The storage control method includes the steps of: making a secondary volume in the storage controller mirror a primary volume in the storage controller and the primary volume be reproduced in the secondary volume; releasing mirroring between the primary volume and the secondary volume with access from the host system to the primary volume being permitted; examining a file system of the secondary volume after the release processing; and reproducing the file system of the secondary volume in a different storage resource if the file system of the secondary volume has no errors.

As described above, according to the present invention, it is possible to provide storage control that leaves no failure in the file system of a secondary volume even if the secondary volume is split from the primary volume without restricting server access to volumes in a storage controller.

DETAILED DESCRIPTION OF THE INVENTION

Figure 1:
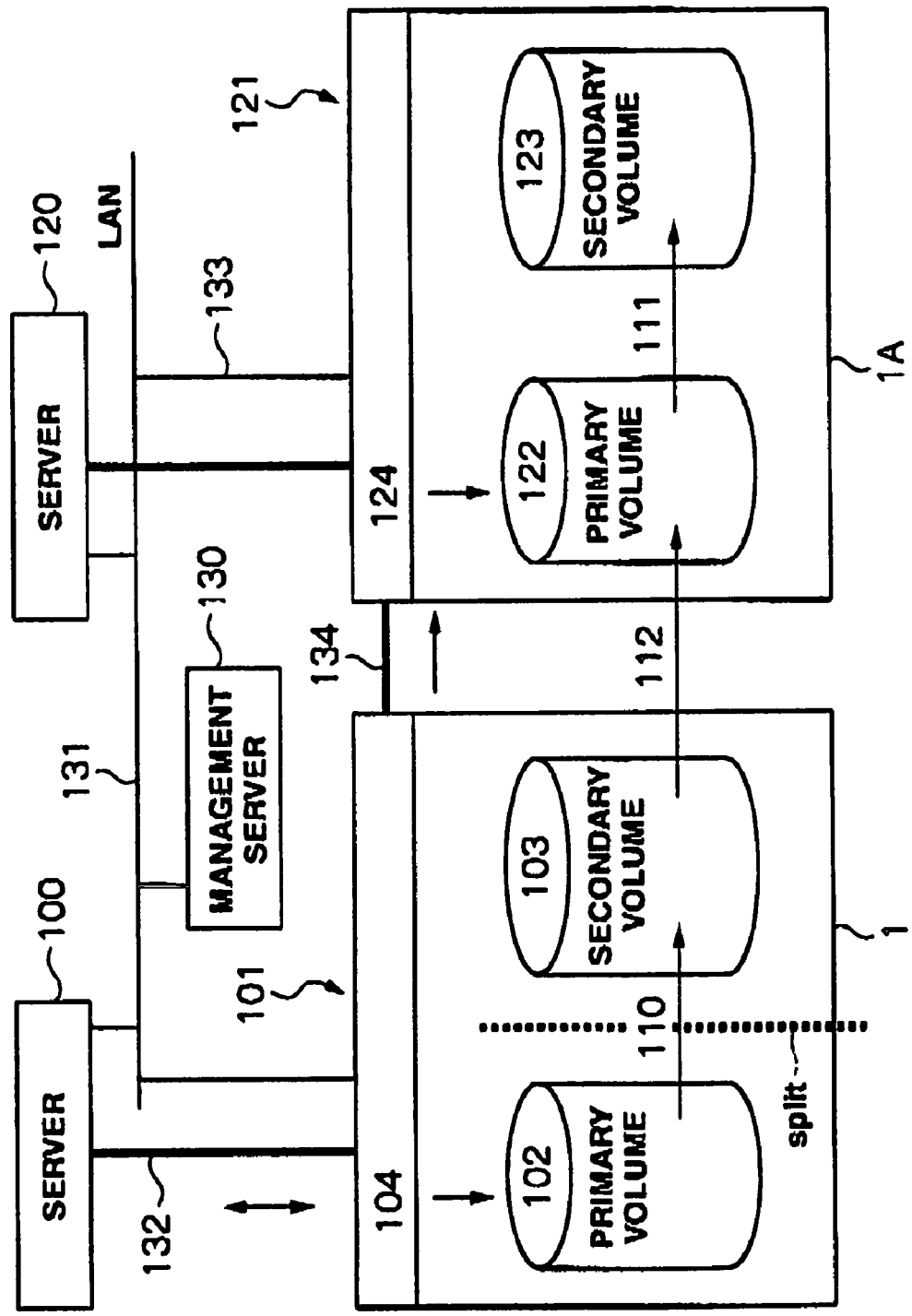
FIG. 1 is a functional block diagram of a storage control system according to this invention.

An embodiment of this invention is described below in detail with reference to the attached drawings. FIG. 1 is a system block diagram of a storage control system that is composed of servers and disk array apparatuses, and configured for disaster recovery.

As shown in FIG. 1, a system configured for disaster recovery generally includes a plurality of sites, i.e., a main site 1 and a backup site 1A. The main site 1 is composed of a server 100 and a disk array apparatus 101 accessible from the server 100, and the backup site 1A is composed of a server 120 and a disk array apparatus 121 accessible from the server 120. The servers 100 and 120, the disk array apparatuses 101 and 121, and a management server 130 are connected to a LAN 131.

The backup site 1A is normally established at a place distant from the main site 1, and the backup site 1A and the main site 1 are able to transfer data to and from each other via a public line or a private line 134. Furthermore, the respective servers and disk array apparatuses, and the management server can mutually communicate via the LAN 131. The backup site may be placed in the same building or on the same floor as the main site. The present invention can also be applied in a system with a plurality of backup sites.

In the main site 1, data is transferred between the server 100 and the disk array apparatus 101 via a Fibre Channel (SAN) 132. The disk array apparatus 101 has a disk controller 104 that controls the disk array apparatus. Having received I/O access from the server 100, the controller 104 writes data to a physical disk connected to the controller 104.

The disk array apparatus 101 includes: a primary volume 102 for storing any result of I/O access from a host computer to the file system; and a secondary volume 103 as a mirror volume synchronized with the primary volume (as indicated by arrow 110 in FIG. 1). The management server 130 can set management information in a memory of the disk array apparatus 101. The foregoing configuration also applies to the backup site 1A. The reference numerals 132, 133, and 134 in FIG. 1 constitute a SAN.

When the server 100 performs data backup, the controller 104 makes the secondary volume 103 (backup target volume) static. The backup is performed at the designated time (designated hour, minute, and second). The controller 104 freezes the content of the backup target volume at the indicated backup time. The controller 104 receives a SPLIT command from the server 100 and splits the secondary volume 103 from the primary volume 102 at the time designated for the backup.

Like the main site 1, the backup site 1A includes a server 120 and a disk array apparatus 121. After the secondary volume 103 is split from the primary volume 102, a volume copy of the content of the secondary volume 103 at the main site 1 is created in a primary volume 122 at the backup site 1A, using the volume copy function of the disk array apparatuses 101 and 121 (as indicated by arrow 121 in FIG. 1). That copying is realized by data transfer via a SAN, a channel extender, a WAN, or a private line (134). Besides copying the entire volume, another method—controlling differences between the volumes and copying the differences only—may also be employed.

At the backup site 1A, the primary volume 122 containing the result of the above-described volume copy is reproduced in the secondary volume 123 inside the chassis of the disk array apparatus 121 (as indicated by arrow 111 in FIG. 1). The backup process is periodically performed in the order: 110→112→111 as shown in FIG. 1. By copying data in the above manner, the data backup system in FIG. 1 can produce up to three generations of backup data.

Figure 2:
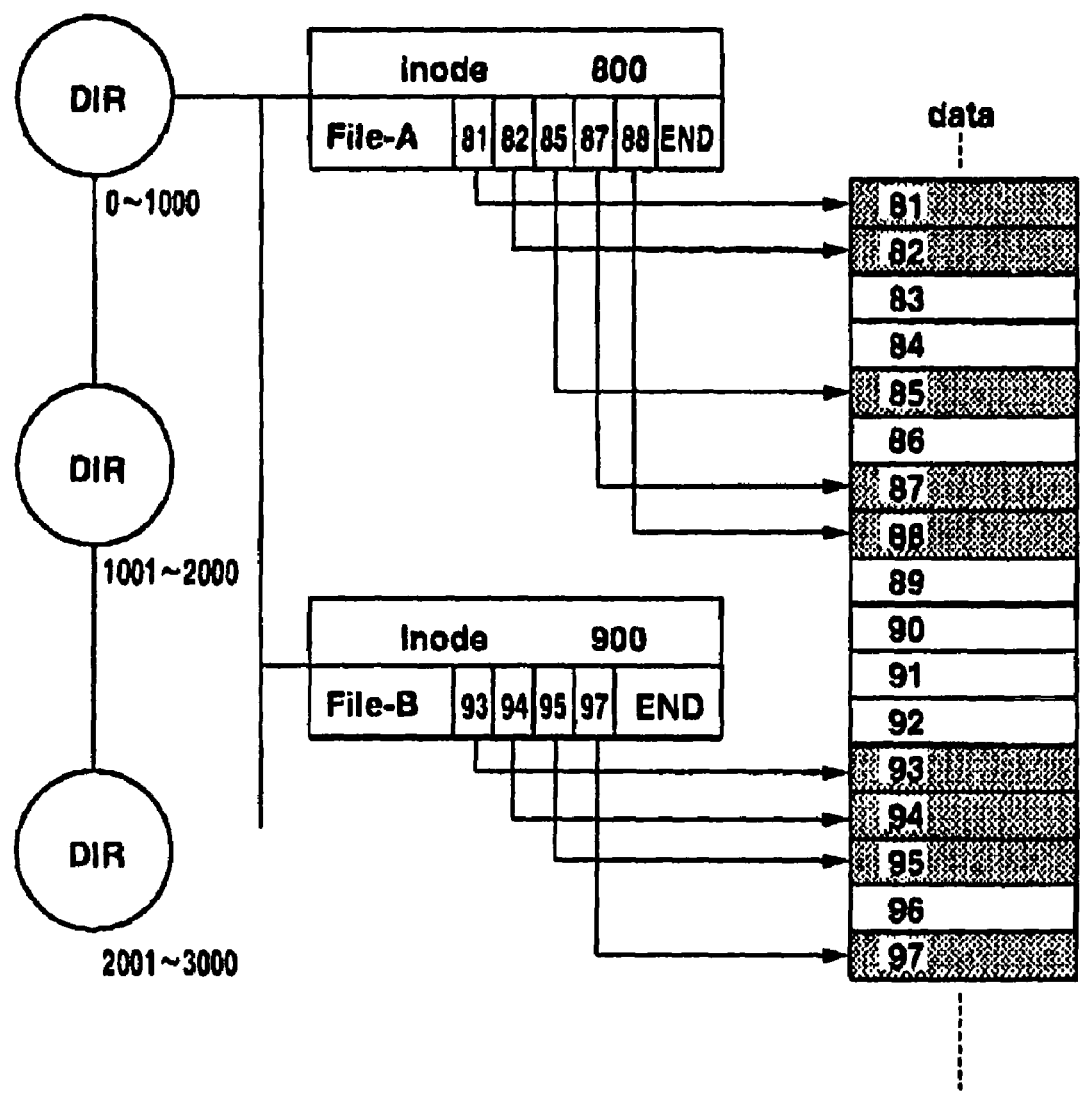
FIG. 2 is a configuration diagram of a file system.

Next, the release of a paring status (SPLIT processing) between a primary volume having a file system and a secondary volume is explained. For example, a UNIX® file system has the configuration shown in FIG. 2. FIG. 2 illustrates the configuration of the file system of the primary volume 102 at the main site 1. For example, when the server 100 intends to write File-A to the file system of the primary volume 102, if the server 100 writes data at number 800 in a directory (DIR), File-A is written with the inode number "800". In the inode, the file name and the number of the address where the actual data is to be stored, like 81, 82, 85, 87 and 88, are recorded, and the actual data is written in the disk blocks having the address numbers 81, 82, 85, 87 and 88. An inode is a metadata structure that shows a file that can be seen by users, and each file has an inode. In other words, the file system has a layered structure. The server 100 follows this layered structure to access a file.

The SPLIT function of separating the mirrored volumes that constitute a pair is not performed by the controller 104 following the file system, but is realized by suspending data mirroring processing at the raw data level upon backup being directed. Consequently, if a SPLIT command is issued from the server 100 to the controller 104 while data is being written from the primary volume 102 to the secondary volume 103, the data being written from the primary volume 102 will be interrupted half way.

Figure 3:
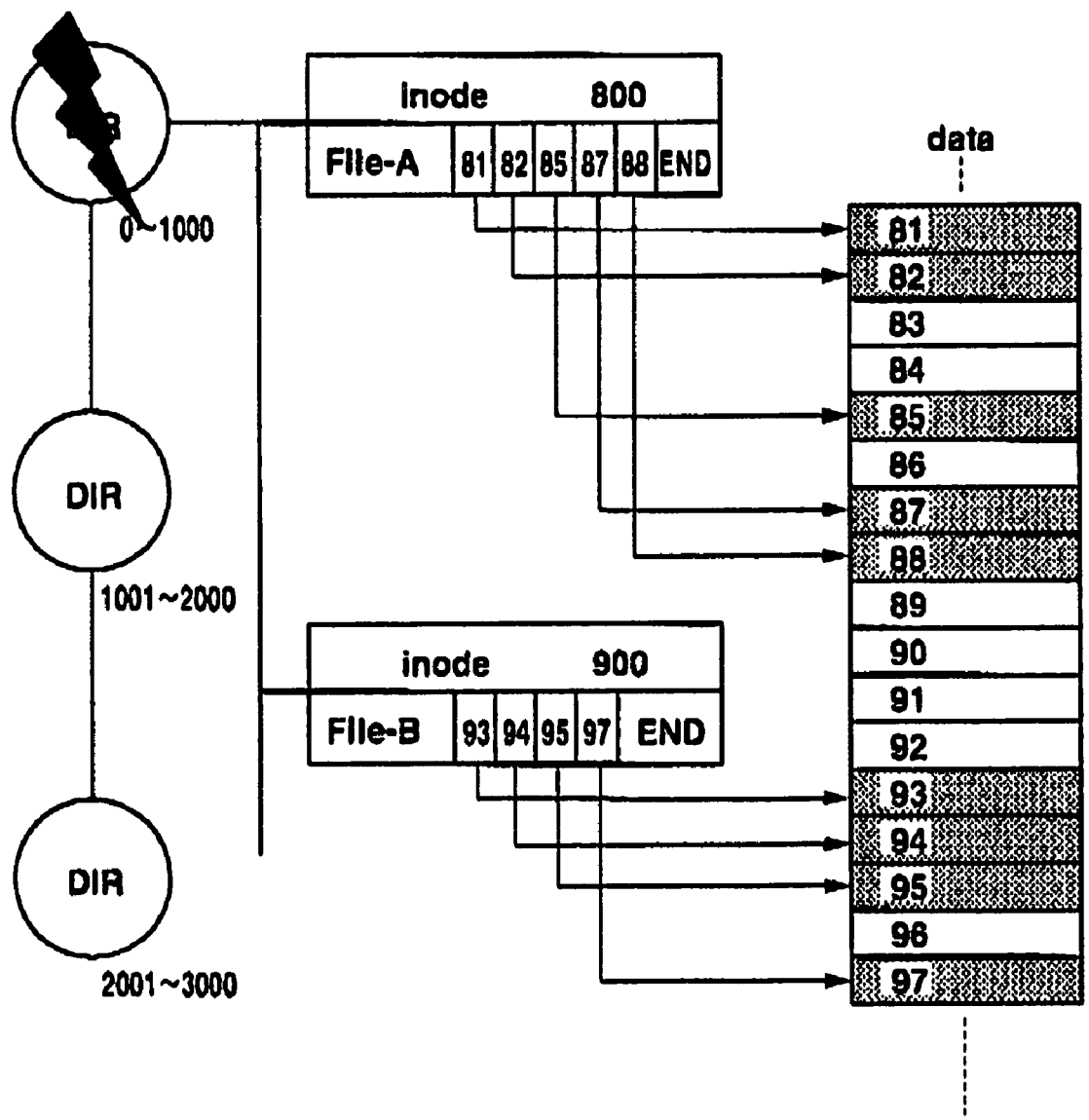
FIG. 3 is a configuration diagram of a file system in the state of being corrupt.

When this happens, if the data being written is in the process of updating DIR data as shown in FIG. 3, there is a possibility that the DIR data may be corrupt. If the DIR data is corrupt, the server 100 becomes unable to refer to any existing subordinate inode or actual data. Assuming that the processing to write data to a volume is performed on a 4 KB basis, if one block with one address number is set to have 4 KB or less, it is possible to ensure a 4 KB-data write process even when the secondary volume 103 is subjected to the SPLIT processing, and thus prevent corruption of data synchronously copied to the secondary volume 103. However, if the SPLIT processing is performed, for example, after the data write processes for blocks 81 and 82, the data write processes for blocks 85, 87 and 88 remain incomplete, causing inconsistency with the content of inode 800, resulting in the file being corrupt. If DIR data or inode data is corrupt, the problem arises that the server becomes unable to read files in the secondary volume 103.

Since SPLIT processing in a disk array apparatus is performed at the raw level, it is impossible to recognize which data the server 100 is writing to the primary volume 102 when a SPLIT command is issued. Thus, if SPLIT processing is executed while the server 100 is writing data to the primary volume 102, there is a possibility that the file system of the secondary volume 103 that has mirrored the primary volume 102 before the SPLIT processing may be corrupt. Furthermore, if the file system is unfortunately corrupt due to the SPLIT processing three times consecutively, there is the possibility that all the volumes 103, 122, and 123 may be corrupt and that recovery from any volume is impossible.

Figure 4:
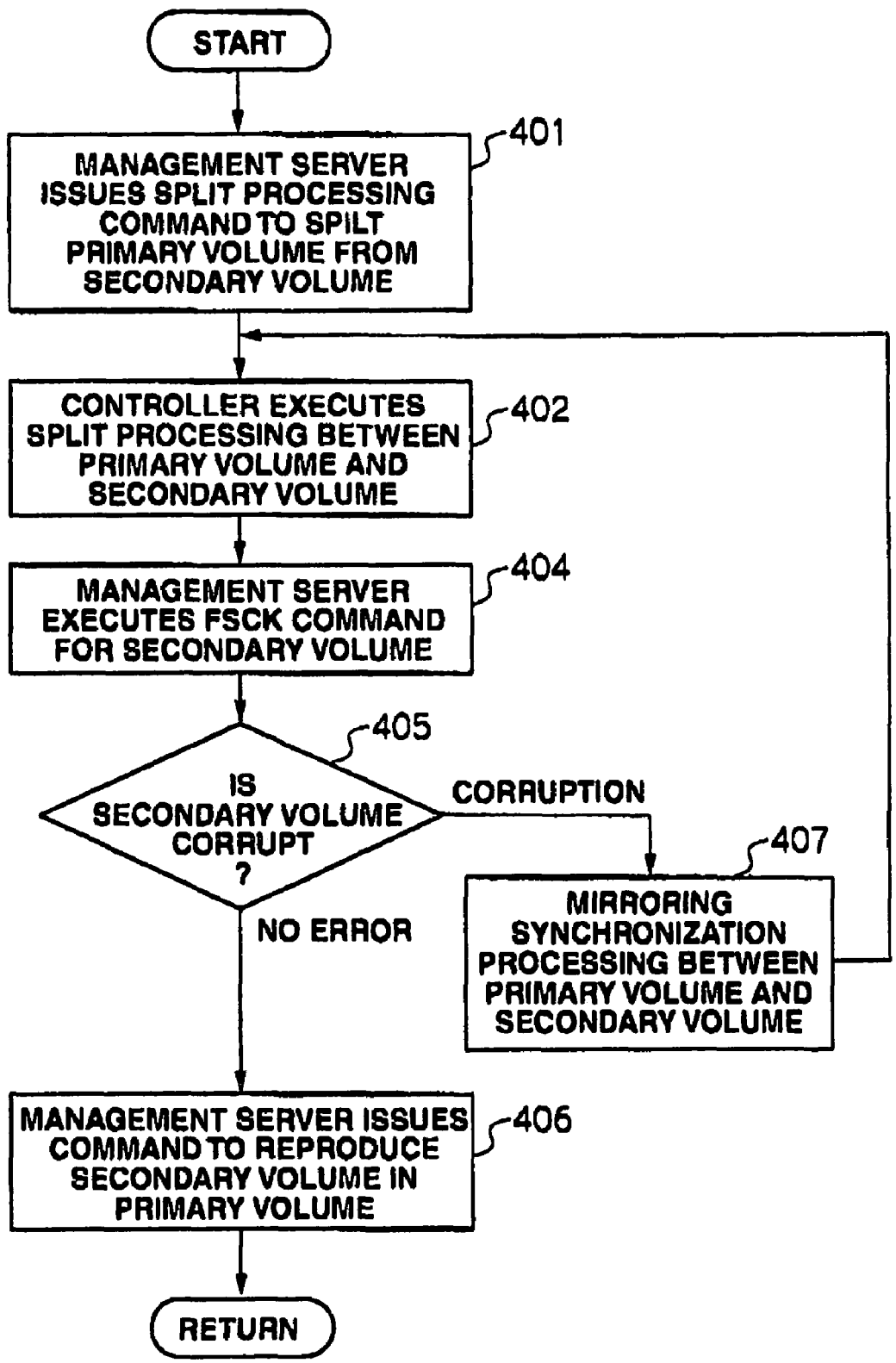
FIG. 4 is a flowchart showing operation of the storage control system according to this invention.

FIG. 4 is a flowchart showing the operation of the storage control system shown in FIG. 1. This flowchart is explained with reference to FIG. 1. In this explanation, the primary volume 102 and the secondary volume 103 shown in FIG. 1 are considered to be Linux file system volumes.

The management server 130 shown in FIG. 1 issues a command to split the secondary volume 103 from the primary volume 102 (401). The controller 104 of the disk array apparatus 101 receives this command, and a micro-program running on the controller splits the secondary volume 103 from the primary volume 102 at the raw level (402).

At that time, there is no need to stop I/O access from the server 100 to the primary volume 102, or I/O access to the secondary volume 103. When the two volumes are split in this condition, some data being written from the primary volume 102 to the secondary volume 103 may be corrupt in some cases, as already stated above.

Next, the management server 130 executes FSCK processing for the secondary volume 103 (404). The FSCK command is a file system examination utility. In Linux, metadata indicating the location and structure of disk data blocks is stored when data is temporarily written in a cache, and the data will be later written to the disk by referring to the metadata. If a file crashes, the FSCK command examines and corrects any inconsistencies between the metadata and actual data. The management server 130 uses this command and examines whether the file system of the secondary volume 103 after the SPLIT processing has been corrupt or not.

If the file system crashes, it is possible for the FSCK command to also restore that crashed file system. However, it may take considerable time to do so. So the file system is examined only in step 404.

Instead of using the FSCK command to examine if the file system has an error or not, there is also a method involving correlating a dummy file for a read-out test with the file system; storing the dummy file in the secondary volume; and examining whether the management server 130 can read the dummy file or not. As shown in FIG. 3, if DIR data is corrupt, the management server cannot read the file. So, in the above method, it is possible to judge that at least the DIR data is not corrupt if the dummy file can be read. Furthermore, another applicable method is a simple checking method—reading the number of files and capacity from the file system management information for the secondary volume. This invention places no limitation on how to examine the file system.

Subsequently, if the management server 130 determines as a result of the FSCK processing that the file system of the secondary volume has no errors or corruption (405), it performs the processing for reproducing the secondary volume 103 at the main site in the primary volume 122 at the backup site 1A (406). If an error is detected in the file system of the secondary volume as a result of the FSCK processing, the management server 130 again performs mirroring synchronization processing between the primary volume 102 and the secondary volume 103 (407). The SPLIT processing and the mirroring processing between the primary and secondary volumes are repeatedly performed until the file system of the secondary volume has no errors. Thus, a client can be assured of the data accuracy in the secondary volume. Since only a short time has passed from the last SPLIT processing to the following mirroring processing, it is normally possible to attain mirroring of the two volumes instantly by difference backup processing. A series of controlling steps shown in FIG. 4 is executed by a disk array management program that runs on the management server 130.

FIG. 4 explains an embodiment where the management server mounts the secondary volume. Instead, a server 100 at a main site may include a management server (disk array management program) and mount a secondary volume.

Figure 5:
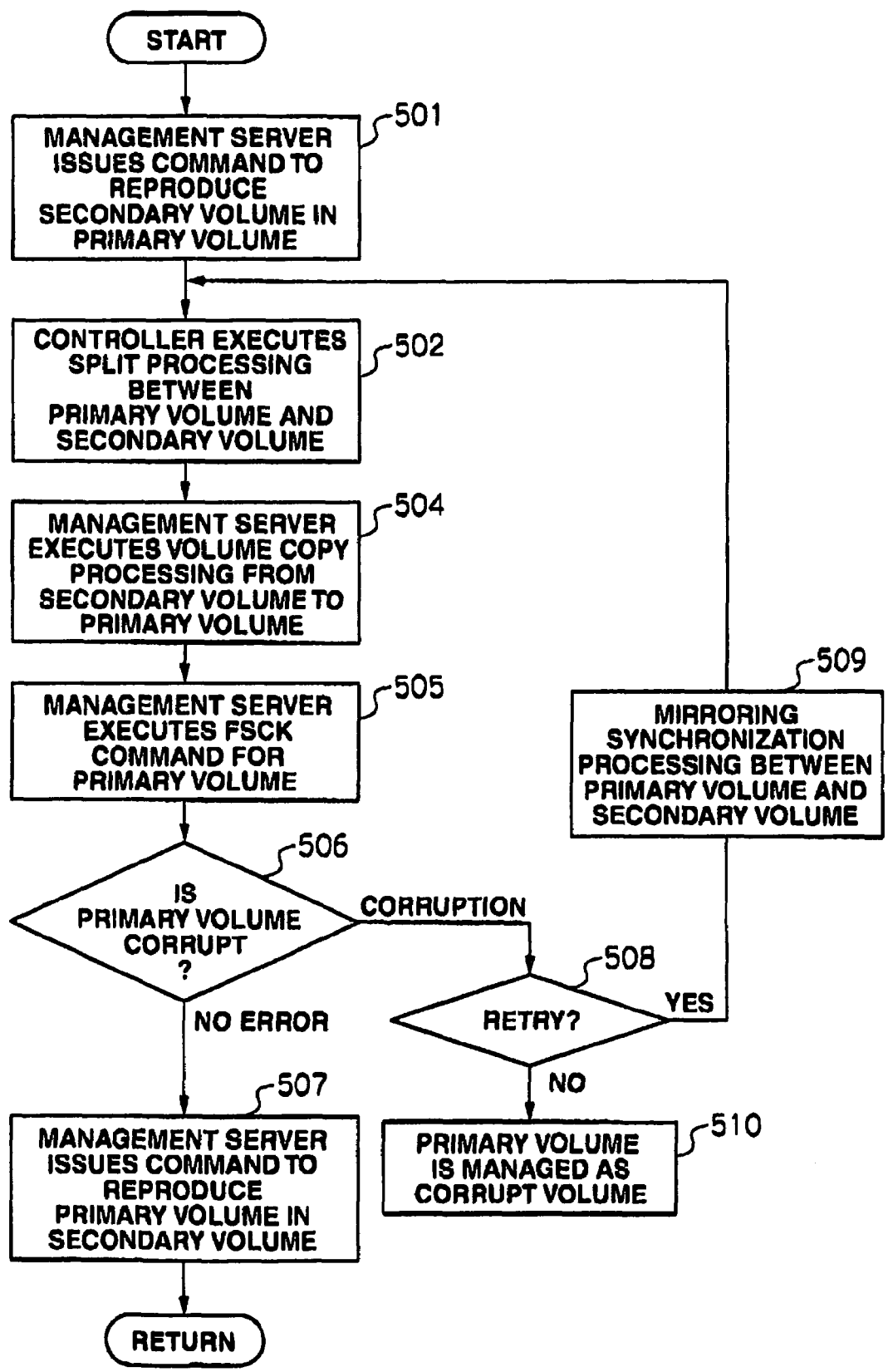
FIG. 5 is a flowchart showing other operation of the storage control system according to this invention.

It is normally possible to mount the primary volume and the secondary volume on the same server after they are split. However in some systems, a server's OS sees the two volumes as having the same name, and cannot mount them at the same time. FIG. 5 shows a flowchart for a processing sequence to deal with the above-described situation.

The steps for the SPLIT processing between the primary volume 102 and the secondary volume 103 (501 and 502) are the same as in FIG. 4. After the completion of the SPLIT processing, the management server 130 performs processing for making a volume copy of the secondary volume 103 in the primary volume 122 at the backup site 1A without examining the secondary volume 103 (504). When copying has been completed, the management server 130 executes an FSCK command for the primary volume 122 at the backup site 1A (505), and determines whether there is any corruption in the volume (506). The management server is connected to the backup site via the LAN 131 as shown in FIG. 1, and thus can execute the FSCK processing at the backup site.

Another possible way is that the management server 130 does not execute the FSCK command, but issues to the server 120 at the backup site 1A a command to execute the FSCK processing for the primary volume 122 at the backup site, and acquires the results returned from the server 120.

If the results of the FSCK processing executed for the primary volume 122 at the backup site show that there are no errors, the subsequent processing for reproducing the primary volume 122 in the secondary volume 123 at the backup site is performed (507). If the volume 122 is corrupt, subsequent processing follows according to either one of the two sequences registered in the system in advance. In one sequence, the controller 124 reports, to the disk array management program that runs on the management server 130, the volume 122 as being a corrupt volume, and does not reproduce the volume 122 in the secondary volume 123 (508). The controller 124 simultaneously reports, to the disk management program, the secondary volume 103 at the main site as also being corrupt. The disk management program recognizes the secondary volume 103 and the primary volume 122 as corrupt volumes, and informs the management server 130 backup system that backup recovery from those volumes will not (cannot) be made (510). In this case, data recovery will be made from the secondary volume 123 at the backup site 1A. This operation can be applied to, for example, a storage control system where a backup copy is created at short intervals such as every hour, and where it is considered sufficient if error-free backup data exists in any of the three generations of data.

In the other sequence, in the storage control system where file system corruption is unacceptable, when corruption is found in the primary volume 122 at the backup site, the management server 130 sends to the controller 104 a command to retry mirroring processing between the primary volume 102 and the secondary volume 103 at the main site, and performs the mirroring processing between the volumes (509). Then, steps from 502 onward are sequentially performed, whereby a client can be assured of the data accuracy in the secondary volume 103.

The backup processing explained in FIGS. 4 and 5 is repeatedly performed under the schedule managed by the disk management program operating on the management server. Also, the disk array management program has a function displaying the progress of the processing described above, using a GUI. According to the storage control system explained above, it is possible to make backups in a state where the continuous operation of the server is secured without having a server application manage I/O access to a file. The present invention is not limited to the embodiments explained herein, and various additions or modifications can be made to the embodiments without departing from the scope of this invention.

What is claimed is:

1. A storage control system comprising:

a host system; and a storage controller, wherein the storage controller comprises a storage device and performs a data processing between the storage device and the host system in response to a request from the host system, wherein the storage controller further comprises:

a primary volume having a file system accessible from the host system;

a secondary volume mirroring the primary volume;

a controller for performing release processing to release mirroring between the primary volume and the secondary volume with access from the host system to the primary volume being permitted;

a management server for executing a management program for examining volume management information about the secondary volume after the release processing;

a second storage controller at a remote site, the second storage controller having at least one volume in which a backup copy of content of the secondary volume is made, wherein the at least one volume of the second storage controller includes a first volume in which a copy of a file system of the secondary volume is made, and a second volume in which a copy of content of the first volume is made, and wherein when the management program examines a file system of the first volume, and if it determines that the file system has no errors, the first volume is reproduced in the second volume.

2. The storage control system according to claim 1, wherein the host system comprises the management server.

* * * * *